(12) United States Patent
Beck et al.

(10) Patent No.: US 10,160,004 B2
(45) Date of Patent: Dec. 25, 2018

(54) CREATING ALIGNED AND ORIENTED FIBER REINFORCED POLYMER COMPOSITES

(71) Applicant: Palo Alto Research Center Incorporated, Palo Alto, CA (US)

(72) Inventors: Victor Alfred Beck, Menlo Park, CA (US); Ranjeet Rao, Redwood City, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 61 days.

(21) Appl. No.: 14/793,193

(22) Filed: Jul. 7, 2015

(65) Prior Publication Data
US 2017/0008026 A1  Jan. 12, 2017

(51) Int. Cl.
*B05D 3/04* (2006.01)
*D04H 1/74* (2006.01)
(Continued)

(52) U.S. Cl.
CPC ............ *B05C 19/06* (2013.01); *B05D 3/0493* (2013.01); *B29B 11/16* (2013.01); *B29C 41/16* (2013.01);
(Continued)

(58) Field of Classification Search
CPC ......... B05C 19/00–19/06; B05C 11/00; B05C 11/10; B05B 7/1409; B05B 7/145;
(Continued)

(56) References Cited

U.S. PATENT DOCUMENTS 4,271,112 A    6/1981  Rossman et al.
4,505,777 A    3/1985  Richter
(Continued)

FOREIGN PATENT DOCUMENTS

WO    1998013185    4/1998

*Primary Examiner* — Dah-Wei D. Yuan
*Assistant Examiner* — Stephen A Kitt
(74) *Attorney, Agent, or Firm* — Miller Nash Graham & Dunn LLP (57) ABSTRACT

A deposition nozzle has a housing, an inlet into the housing arranged to receive a solution carrying randomly oriented fibers, an orientation component within the housing, the orientation component positioned to receive the solution from the inlet and operate to produce aligned fibers in a predetermined, single direction, and an outlet on the housing arranged to receive the aligned fibers and deposit them on a substrate. A system includes a porous substrate, a deposition nozzle, a reservoir of randomly oriented fibers in solution connected to the deposition nozzle, the deposition nozzle position adjacent the porous substrate and connected to the reservoir, the nozzle to receive the randomly oriented fibers and output aligned fibers, and a vacuum connected to the porous substrate to remove fluid from the porous substrate as the deposition nozzle deposits the aligned fibers on the porous substrate to produce a fiber pre-form having aligned fibers. A method includes providing a reservoir of randomly oriented fibers in a solution, dispensing the solution of randomly oriented fibers through a nozzle having an orientation component onto a porous substrate as a solution of aligned fibers, and immobilizing the fibers to form a fiber pre-form.

7 Claims, 10 Drawing Sheets

(51) Int. Cl.
*B05C 19/06* (2006.01)
*B29B 11/16* (2006.01)
*B29C 41/16* (2006.01)
*B29C 47/32* (2006.01)
*B29C 70/14* (2006.01)
*B29C 70/38* (2006.01)
*B29C 70/48* (2006.01)
*D04H 1/70* (2012.01)
*B29C 47/10* (2006.01)

(52) U.S. Cl.
CPC .............. *B29C 47/32* (2013.01); *B29C 70/14* (2013.01); *B29C 70/384* (2013.01); *B29C 70/48* (2013.01); *D04H 1/74* (2013.01); *B29C 47/1045* (2013.01); *D04H 1/70* (2013.01)

(58) Field of Classification Search
CPC .......... D04H 1/70; D04H 1/74; B29C 70/083; B29C 70/14; B29C 70/20; B29C 70/202; B29C 70/305; B29C 47/32; B29C 41/16
See application file for complete search history.

(56) References Cited

U.S. PATENT DOCUMENTS

| | | | |
|---|---|---|---|
| 5,268,015 A * | 12/1993 | Furtak | D04H 1/4209 156/62.4 |
| 5,580,512 A | 12/1996 | Koon et al. | |
| 6,025,285 A | 2/2000 | Vyakarnam et al. | |
| 6,029,897 A * | 2/2000 | Jander | B29B 11/16 239/654 |
| 6,123,882 A | 9/2000 | Uchida et al. | |
| 7,951,464 B2 | 5/2011 | Roberts | |
| 8,028,736 B2 | 10/2011 | Jander | |
| 2005/0074993 A1 | 4/2005 | Alam et al. | |
| 2014/0255646 A1 | 9/2014 | Griess et al. | |

* cited by examiner

CREATING ALIGNED AND ORIENTED FIBER REINFORCED POLYMER COMPOSITES

TECHNICAL FIELD

The disclosure here relates to fiber composite sheets, more particularly to aligned and arbitrarily oriented fiber reinforced fiber composite sheets.

BACKGROUND

Manufacturing processes may employ fiber preforms. The preforms typically consist of sheets or mats of fibers. The mats are shaped into desired forms or inserted into molds as a matrix. Polymer materials are then infused into the matrix and the desired article is formed. The article is then hardened and removed from the mold.

Formation of the fiber preforms typically involves a complicated, expensive process with expensive equipment. One challenge lies in attempts to orient the fibers in a desired direction for better strength. Advances in printing technology may hold the answer to reducing the costs and complexity of the process while also allowing for better alignment of the fibers, but to date no such approach exists.

SUMMARY

One embodiment consists of a deposition nozzle having a housing, an inlet into the housing arranged to receive a solution carrying randomly oriented fibers, an orientation component within the housing, the orientation component positioned to receive the solution from the inlet and operate to produce aligned fibers in a predetermined, single direction, and an outlet on the housing arranged to receive the aligned fibers and deposit them on a substrate.

Another embodiment consists of a system including a porous substrate, a deposition nozzle, a reservoir of randomly oriented fibers in solution connected to the deposition nozzle, the deposition nozzle position adjacent the porous substrate and connected to the reservoir, the nozzle to receive the randomly oriented fibers and output aligned fibers, and a vacuum connected to the porous substrate to remove fluid from the porous substrate as the deposition nozzle deposits the aligned fibers on the porous substrate to produce a fiber pre-form having aligned fibers.

Another embodiment consists of a method including providing a reservoir of randomly oriented fibers in a solution, dispensing the solution of randomly oriented fibers through a nozzle having an orientation component onto a porous substrate as a solution of aligned fibers, and immobilizing the fibers to form a fiber pre-form.

DETAILED DESCRIPTION OF THE EMBODIMENTS

Figure 1:
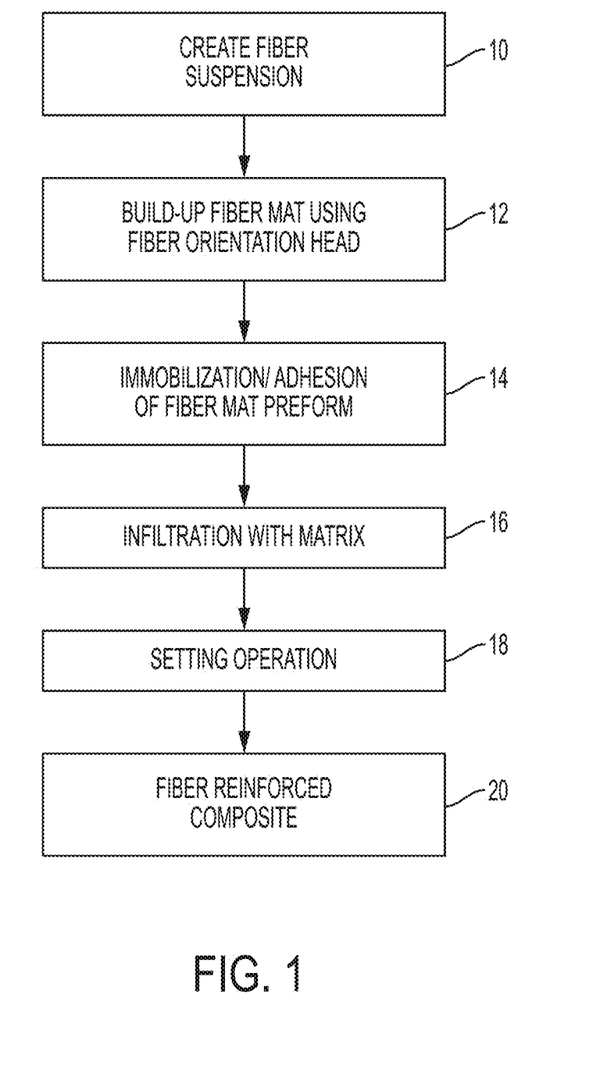
FIG. 1 shows a flowchart of an embodiment of a method to produce a fiber reinforced composite from a preform with oriented fibers.
Figure 2:
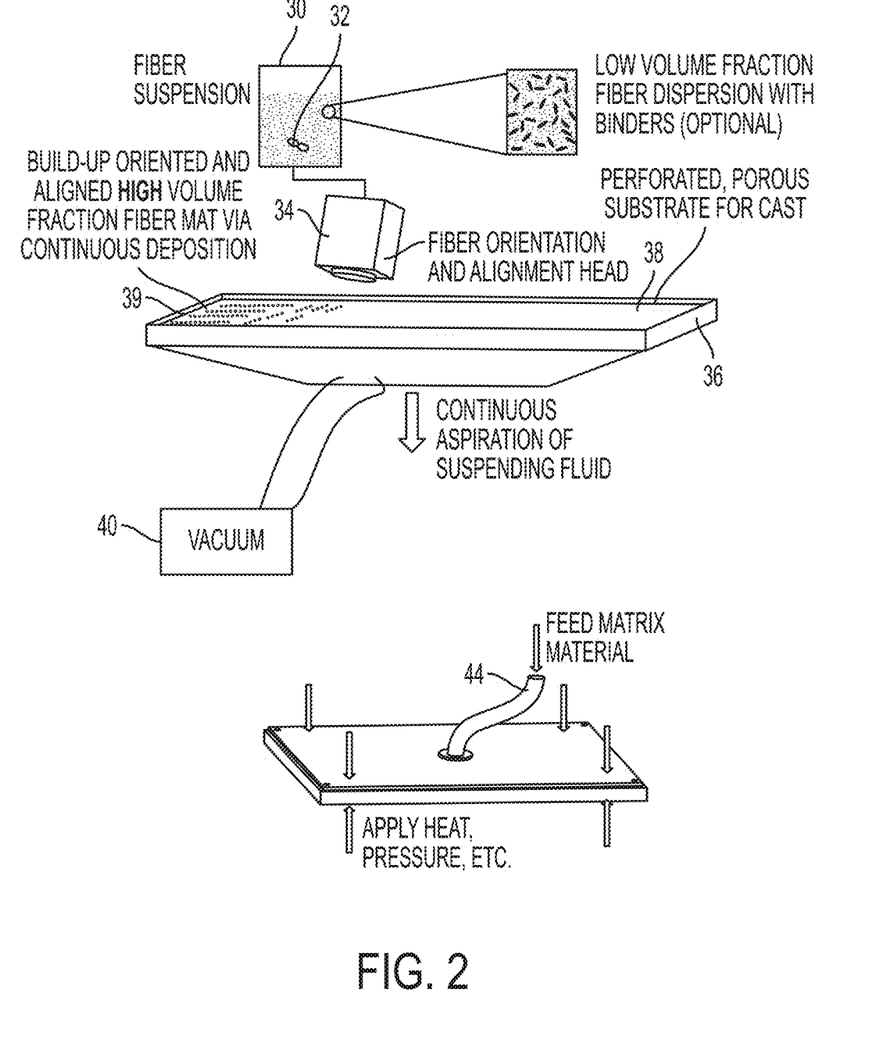
FIG. 2 show an embodiment of a system to produce a fiber reinforced composite from a preform with oriented fibers.

FIGS. 1 and 2 show an embodiment of a system and method to create oriented fiber preforms and then subsequently using that preform to produce a fiber reinforced composite. The discussion of FIG. 1 will be in conjunction with other drawings to provide information about the embodiments and variations in the system.

At an initial part of the process, a fiber suspension in a fluid is created at 10. The suspension may consist of a low-volume fraction of a fibers dispersed in a solution. In one embodiment, the solution may consist of a Newtonian fluid. In one embodiment, the solution may include a binder. In the system diagram of FIG. 2, the system 30 includes a reservoir 32 to hold the suspension.

At 12, a fiber orientation and alignment head, show at 34 in FIG. 2, dispenses the fiber suspension onto a substrate of some sort. In one embodiment, shown in FIG. 2, the substrate 38 is a perforated and/or porous substrate held by a fixture 36. The substrate may be mounted or otherwise connected to an aspiration system such as a vacuum. An aspiration device such as vacuum 40 removes extra fluid from the suspension to leave the fibers behind. This results in a high fractional composition fiber mat.

Once the solution has been dispensed to sufficiently build up a preform mat, or during dispensing, the preform undergoes some sort of immobilization or adhering process at 14 to fix the fibers in place and solidify or semi-solidify the preform. The immobilization may involve a binder in the solution, as discussed above, as the solution is removed, the binder stays behind and fixes the fibers in place. As will be discussed in more detail, an adhesive or binder may be sprayed onto the preform.

The embodiments here are directed to the formation of the preform with oriented fibers formed using a unique fiber orientation head. Once manufactured, this preform may receive a matrix of polymer/resin to form a fiber reinforced composite. For completeness, this discussion sets out embodiments of how to perform an infiltration of the matrix into the preform, with the understanding that this process is optional and may take many different forms.

The preform receives the matrix at 16 in FIG. 1. The matrix may consist of many different materials, including but not limited to, various types of polymers such as resins, polyurethane compounds, etc. and may be in liquid form or take the form of sheets of thermoplastic or other moldable materials. Many different types of materials can be used. In general, any material that is used for Resin Transfer Molding (RTM) or Resin Infusion Molding (RIM) could be used. They key is to adjust the viscosity and curing properties to make them compatible with the infusion process, and this would depend on the particular pre-form that is made. Typical viscosities are in the range 50-1000 centipose. Common RTM and RIM materials include: unsaturated polyesters, vinyl esters, epoxies, polyimides, phenolics, etc. It may be possible to use thermoplastics if adjustments are made for their high viscosity. The process needs to control the temperature well enough to achieve a reasonably low viscosity. Common thermoplastics include: polypropylene, nylon, polycarbonate, poly-ethylene terephthalate (PET), acrylonitrile-butadiene-styrene (ABS), etc. In the example of FIG. 2, the matrix is fed into the preform as a liquid through the feed mechanism 44.

The infiltration process results in a wet matrix contained by the fiber preform. This structure requires setting to form a finished reinforced fiber composite. The setting operation may involve the application of heat and/or pressure, then a cooling process to solidify the matrix with the preform at 18 in FIG. 1. The post-processing will depend on the material that is infused. At 20 in FIG. 1, this results in a fiber reinforced composite 42 in FIG. 2.

Figure 3:
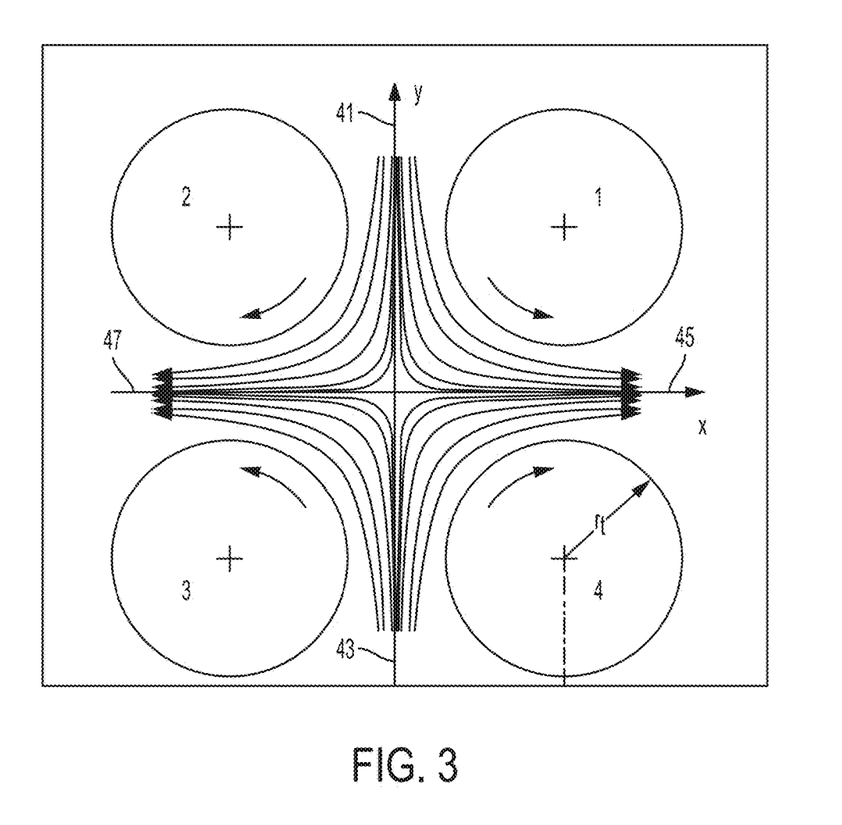
FIG. 3 shows an embodiment of a four-roll mill.

Several aspects of this overall discussion have unique features. One such feature is the fiber orientation and alignment head 34 shown in FIG. 2. The fiber orientation head creates an extensional flow, and extensional flows are ideal for alignment of fibers in a suspension. FIG. 3 shows an example of a mechanical four roll mill. The mechanical four roll mill has two inlets 41 and 43. The 4 rolls of the mill counter rotate, pushing the liquids out the outlets 45 and 47. This type of extensional flow from the outlets causes fibers in the suspension to align.

Figure 4:
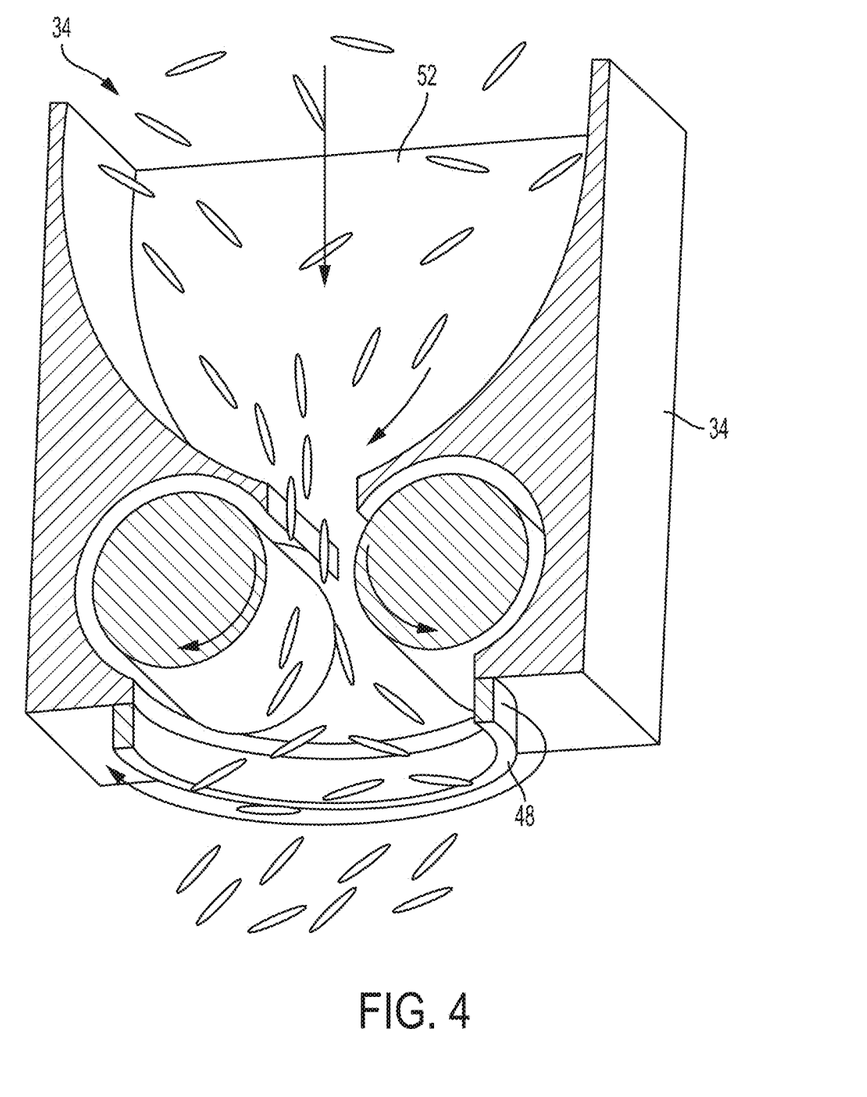
FIG. 4 shows an embodiment of a fiber orientation and alignment head with a two-roll mill.

FIG. 4 shows one embodiment of a fiber alignment head, which may be referred to as a fiber alignment and orientation head. The alignment head has a housing 35 that contains the orientation component, discussed in more detail later. In FIG. 4, the housing 35 has a rotating ring 48 that can control the angle of the alignment of the fibers as they exit the head. In this embodiment, the housing contains a 2-roll mill. The suspension with the fibers flows from the bottom of the housing as shown in the drawing, into the 2-roll mill. The motion of the rollers causes the fibers to align as they exit the outlet 48.

Figure 5:
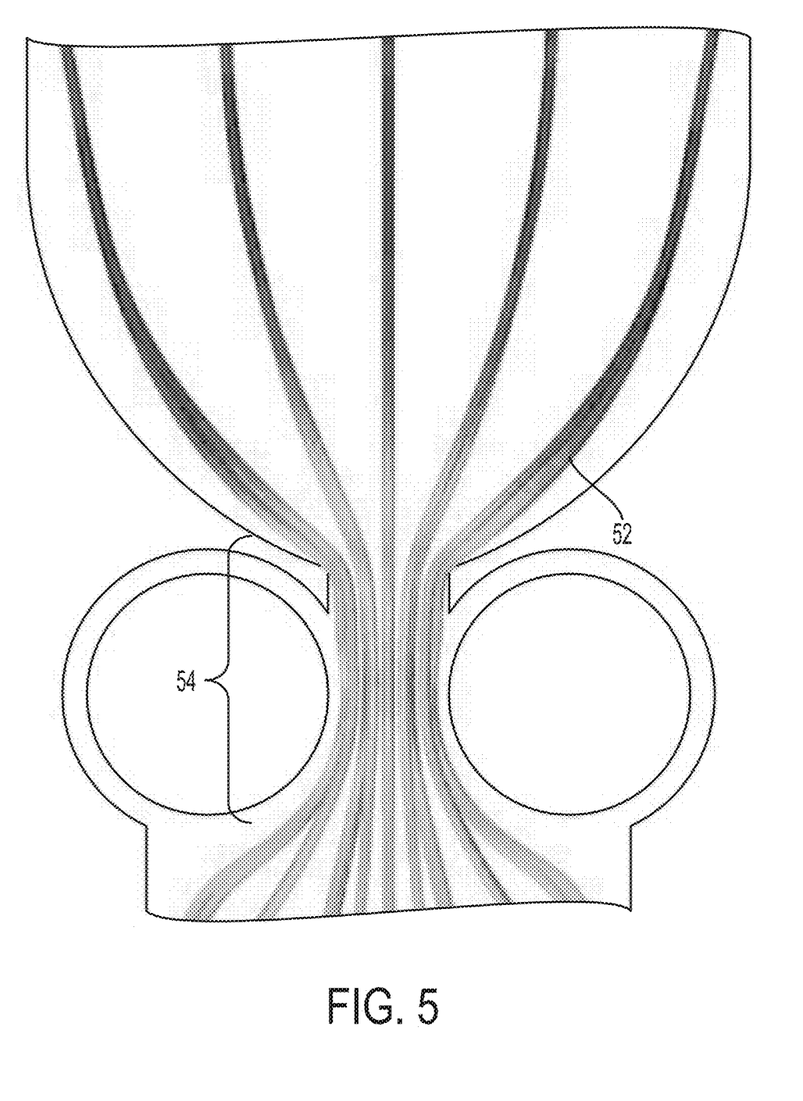
FIG. 5 shows a representation of an orthogonal extensional flow.
Figure 6:
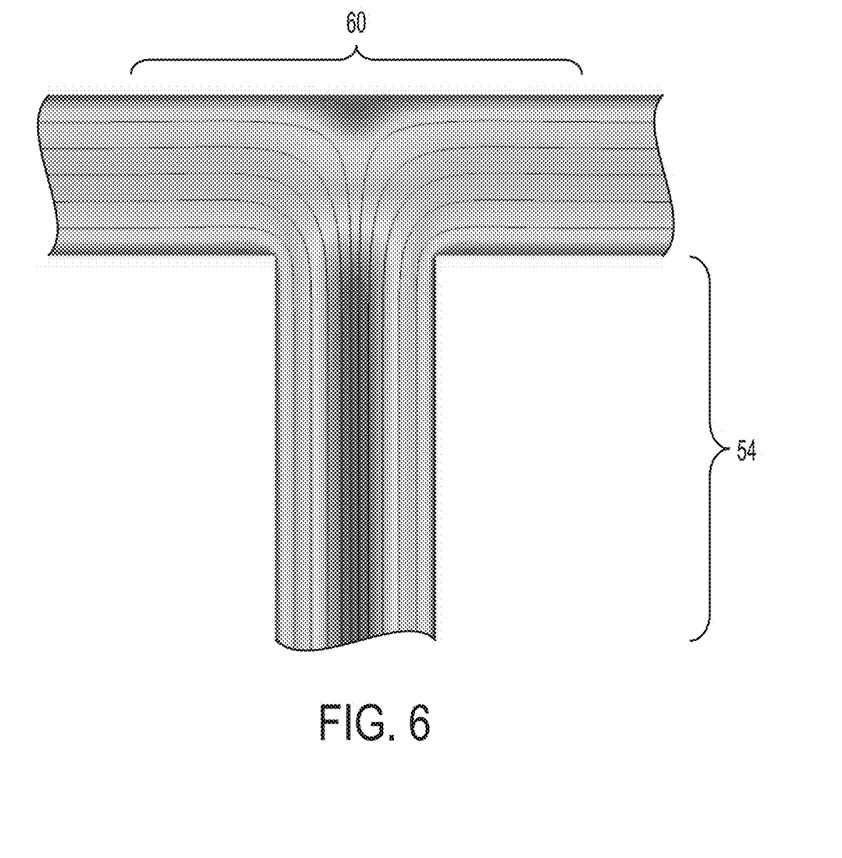
FIG. 6 shows an alternative representation of an orthogonal extensional flow.

The flows may be better understood looking at the flow diagram of FIG. 5. The housing 34 has an inlet flow 52 that narrows into a path 54 between rolls and then exits the print head as an aligned flow. In the embodiment of a rolling mill, the rollers create a splaying flow as shown in FIG. 6. The rollers cause the fibers to align between then in the region 54 and then exit the mill in a flow 60.

Figure 7:
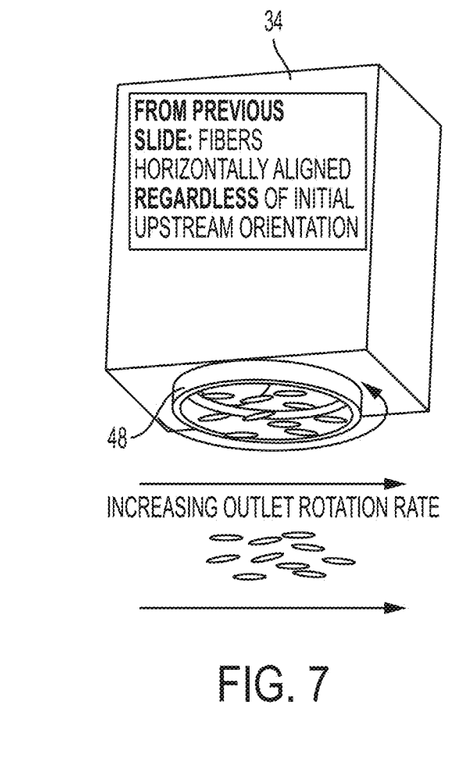
FIGS. 7-9 show embodiments of changing angles of fibers from an orientation and alignment head.
Figure 8:
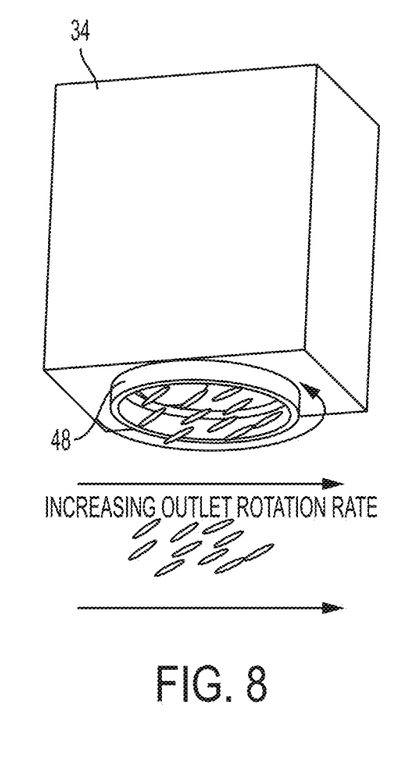
Figure 9:
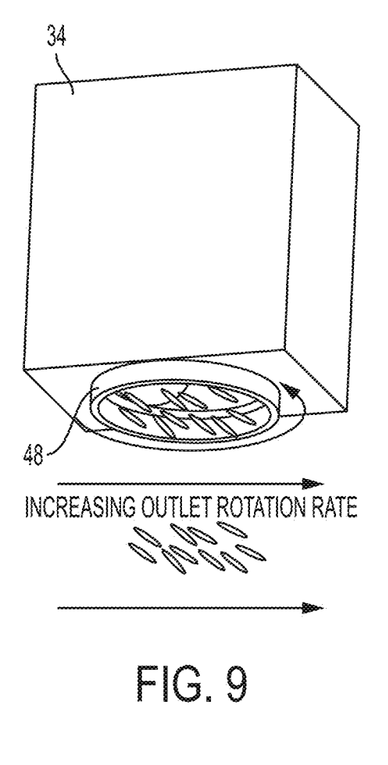

As mentioned above the head may rotate or may have a rotational ring 48 at the outlet. The rotation can alter the angle for the fibers as they exit the head. FIGS. 7-9 show different possibilities. In FIG. 7, the fibers are aligned horizontally relative to the picture. As the rotation rate of the head or ring increases, the exit angle for the fiber changes. FIG. 8 shows a first exit angle that comes from a first rotation rate, and FIG. 9 shows a second exit angle that comes from a second rotation rate. Different applications may have different preforms with different angles and different structural aspects. The ability to rotate the output allows for better control of the fiber orientation.

Figure 10:
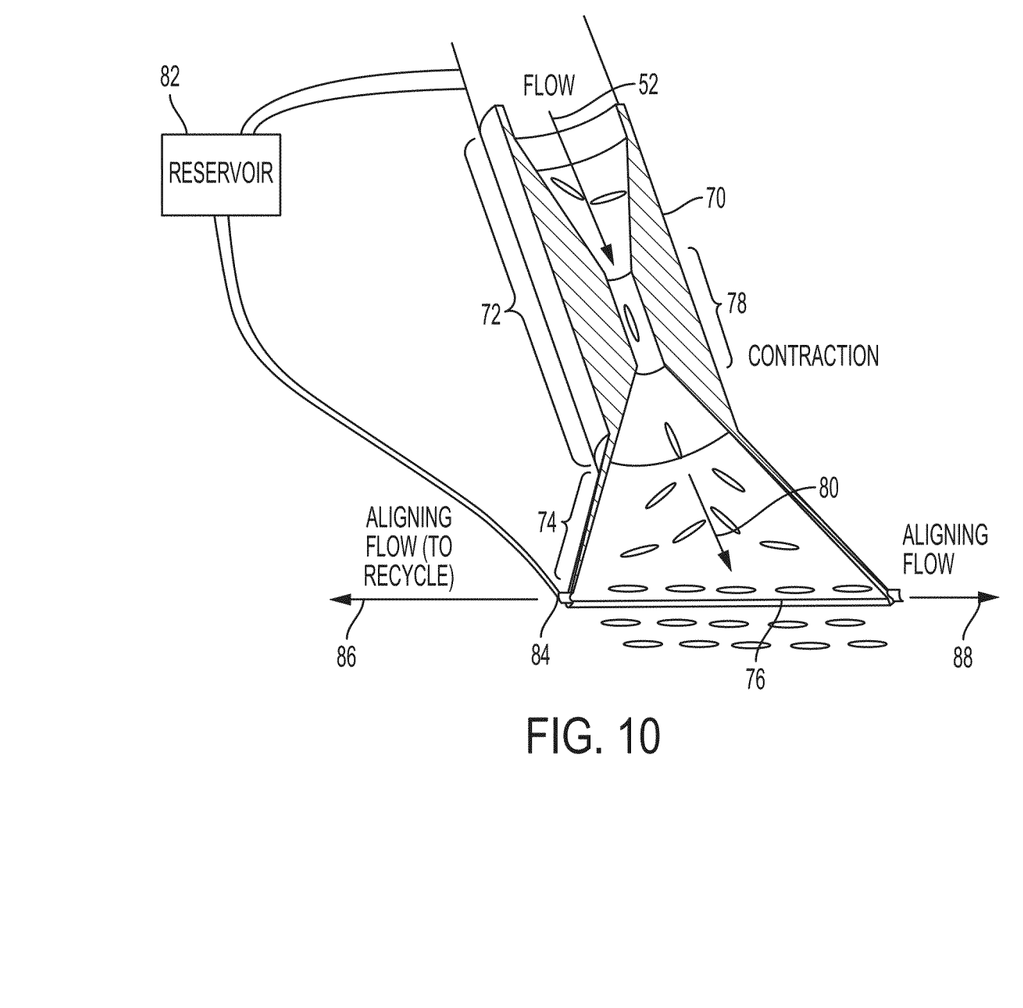
FIG. 10 shows an alternative embodiment of a fiber orientation and alignment head with recycling flow.

In an alternative embodiment to the rollers within the housing, the housing could have a structure within it that creates this splaying flow. FIG. 10 shows an alternative housing 70. The housing has a cylindrical portion 72, which narrows down into the output portion 74. As the cylindrical portion tapers down to the output portion 74, the dimensions of the output portion get larger or 'wider' in the direction of the flows shown by the arrow, but get smaller orthogonal to the flow direction. In the example shown, the resulting output portion has a larger dimension left to right on the page than the cylindrical portion, but is much narrower going into and out of the page. This results in the output portion of the housing being not much wider than the width of the slit 76.

FIG. 10 shows the details of the inside of the housing of this embodiment as well as the addition of a recycling flow. As the material enters the head from the reservoir 82 in the flow direction 52, the inlet narrows to a contraction 78. The contraction 78 forces the fibers within the solution to begin to align parallel to the flow axis. This guarantees that all fibers exit in the center of the nozzle and have the same starting orientation before processing to the expansion portion 74. The contraction is followed by the expansion outlet portion 74. The outlet portion widens in one direction over the contraction 78, but narrows in a dimension orthogonal to the widening direction. This causes alignment orthogonal to the flow axis.

This may be sufficient to cause the fibers to align. As an enhancement, the alignment head may have a recycling flow outlet 84 that applies negative pressure to pull the flow in the direction shown by the arrows 86 and 88. This will be referred to the recycling or secondary flow. The main flow moves out of the nozzle in the direction of the arrow 80. The recycling flow assists in the alignment of the fibers as they exit the head. This enhances the splaying flow discussed above.

Regardless of the embodiment of the fiber orientation head used, the preform may need to undergo further processing prior to the infiltration with the matrix. During fiber deposition, vacuum pressure will serve to compress and immobilize the deposited fibers and remove the carrier fluid. In addition, the fibers may undergo further immobilization. The solution may include a binder that holds the fibers in place when the fluid is removed. Alternatively, the fiber preform may be sprayed or otherwise coated at least partially with a binder solution. The binder may facilitate handling of the fiber perform for the next processing step. It may also improve the thermoplastic interface quality of the preform when it is infiltrated with the matrix.

Figure 11:
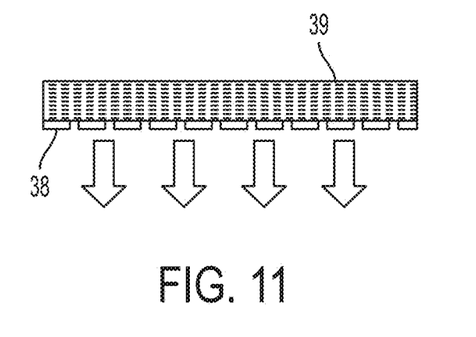
FIGS. 11-12 show an embodiment of fiber immobilization.
Figure 12:
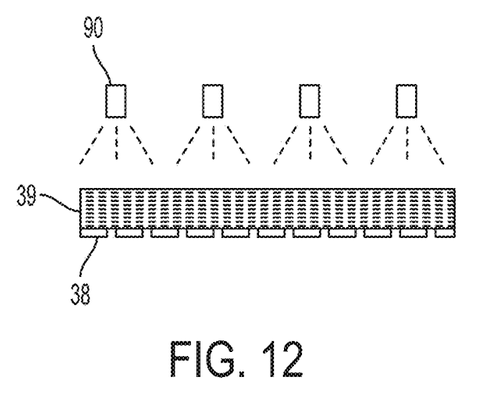

FIG. 11 shows a side view of the fiber preform 39 as it undergoes deposition with an applied vacuum. The substrate 38 is porous, which allows the vacuum to act on the preform. As shown in FIG. 12, spray heads such as 90 dispense the binder solution onto the preform. The binder may need to undergo a further setting process such as drying or application of heat.

Figure 13:
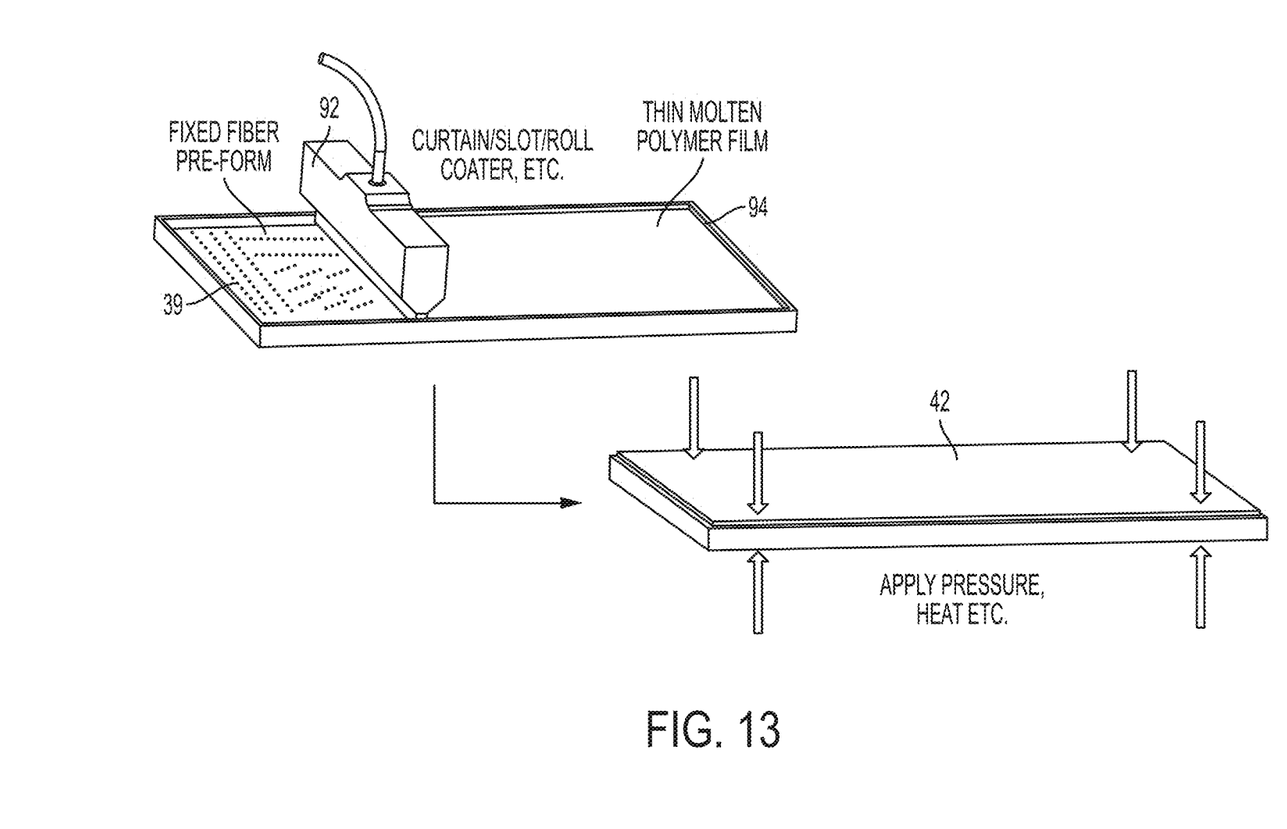
FIG. 13 shows an embodiment of a method to infiltrate a fiber preform with a matrix.

As mentioned above, once the preform with the oriented fibers is completed, it may be infiltrated with a matrix. One embodiment of such a process is shown in FIG. 13. The fiber preform 39 may be coated or infiltrated with a molten polymer or resin 94 using an applicator 92 such as a curtain, slot, roll coater, etc. The matrix may solidify merely by allowing it to cool and/or dry. Alternatively, the matrix may require the application of heat and pressure as shown in FIG. 13, resulting in the fiber reinforced composite 42.

In this manner, a unique nozzle allows for orientation of fibers in a solution to create a fiber preform. The preform may have fibers orientated according to the form needed. After infiltration of the matrix, the resulting fiber reinforced composite material or shape has superior strength and the nozzle enables relatively inexpensive, relatively simple manufacturing.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A fiber orientation and alignment system, comprising:
   a fiber orientation and alignment head;
   an inlet arranged to receive a solution carrying randomly oriented fibers from a reservoir connected to the fiber orientation and alignment head;
   an orientation component, the orientation component positioned to receive the solution from the inlet and operate to produce aligned fibers in a predetermined, single direction within the solution;
   an outlet arranged to receive the solution with the aligned fibers and deposit them on a substrate in an aligning direction, the outlet further to generate a secondary flow of solution in a direction different from the aligning direction;
   a recycling outlet positioned to collect fluid passing under the outlet and to return unused fluid to the reservoir of solution; and
   a head housing that contains the inlet, orientation component, outlet and recycling outlet in a single structure.

2. The fiber orientation and alignment system of claim 1, wherein the orientation component comprises at least two rollers.

3. The fiber orientation and alignment system of claim 2, wherein the rollers include actuators connected to the rollers, the actuators to rotate the rollers opposite each other.

4. The fiber orientation and alignment system of claim 2, further comprising a narrowing portion of the inlet adjacent the rollers.

5. The fiber orientation and alignment system of claim 1, further comprising a rotatable outlet ring attached to the outlet.

6. The fiber orientation and alignment system of claim 1, wherein the head is rotatable.

7. The fiber orientation and alignment system of claim 1, wherein the orientation component comprises a contraction in the inlet, the contraction narrow enough to force the randomly oriented fibers to align in a direction parallel to an axis of flow, and an outlet portion that is wider than the contraction in one direction and narrower in the contraction in a direction orthogonal to the one direction that causes the fibers to align orthogonal to the axis of flow.

* * * * *